June 3, 1958 A. F. JAQUES 2,837,690
CIRCUIT ARRANGEMENTS EMBODYING CATHODE RAY TUBES
Filed Feb. 11, 1957
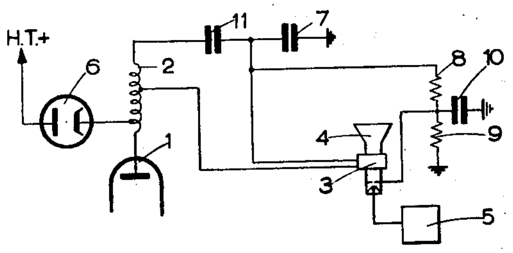
Inventor
A. F. Jaques
By Glascock Downing & Seebold
Attys.

United States Patent Office 2,837,690

Patented June 3, 1958

2,837,690

CIRCUIT ARRANGEMENTS EMBODYING CATHODE RAY TUBES

Anthony Francis Jaques, Farnham, England, assignor to Electric & Musical Industries Limited, Hayes, England, a company of Great Britain Application February 11, 1957, Serial No. 639,331

Claims priority, application Great Britain February 15, 1956

1 Claim. (Cl. 315—20)

This invention relates to circuit arrangements embodying cathode ray tubes and has particular but not exclusive reference to television receivers.

When employing cathode ray tubes in particular of the projection type in television receivers it is desirable to provide means to reduce the beam current to a low value in the event of failure of the line scan in order to avoid damage to the fluorescent screen of the tube. It is common practice to employ a scanning circuit of the resonant return type employing a voltage boost condenser and in the event of failure of the line scan circuit a suitable switching voltage can be obtained from the boost condenser and applied to switch-off the cathode ray tube or else to reduce the beam current to a value which is sufficient to prevent damage to the screen as described in United States Patent No. 2,743,380.

However, this arrangement may not afford adequate protection in the event of an open circuit occurring in the scanning coils or in the leads thereto and accordingly it is the object of the present invention to provide an improved circuit arrangement with a view to reducing the beam current in such event.

According, therefore, to the present invention there is provided a circuit arrangement embodying a cathode ray tube, a scanning circuit including scanning coils for said tube and a transformer for feeding current to said coils, a voltage boost condenser for deriving a voltage from said scanning circuit and means for employing the voltage set up across said boost condenser for controlling the intensity of the cathode ray beam of said tube, wherein said voltage boost condenser is arranged in series with said transformer and a further condenser is provided in series between said transformer and said voltage boost condenser and one lead to the scanning coils is connected to said transformer and another lead to a point between said condensers so that in the event of an open circuit occurring in said scanning coils or the leads thereto said further condenser prevents the flow of direct current to said boost condenser so that the voltage across said boost condenser diminishes and serves to reduce the intensity of the cathode ray beam.

In order that the said invention may be clearly understood and readily carried into effect, it will now be more fully described with reference to the accompanying drawing which illustrates an embodiment of the invention.

The invention is particularly applicable to television receivers embodying a cathode ray tube of the projection type and is mainly concerned with the protection of the screen of the cathode ray tube in the event of open circuiting of the line deflecting coils of the cathode ray tube or of the connections thereto. As shown in the drawing, the reference numeral 1 indicates the output valve of the line frequency scanning generator having in its anode circuit an autotransformer 2 which serves to drive a sawtooth current through the line scanning coils indicated at 3 of a cathode ray tube 4 of the projection type, the cathode of which is fed with video signals from a source indicated at 5. The high tension supply for the valve 1 is connected to a point on the transformer through a diode 6 which functions as the damper or efficiency diode of the well-known resonant return type of scanning circuit. The reference numeral 7 indicates the usual boost condenser, which serves to boost the voltage supply for the valve 1. The voltage developed across the boost condenser 7 is fed to the control electrode of the cathode ray tube via a suitable resistive network so that during normal operation of the circuit, the normal beam current is permitted to flow from the cathode of the cathode ray tube 4. In the example shown the resistive network comprises a pair of resistances 8 and 9 in series, the junction between which is connected to the control electrode of the cathode ray tube 4 and to earth via a condenser 10, which serves during normal operation to maintain the control electrode at a substantially constant potential. In series between the transformer 2 and the condenser 7 and in series with the scanning coils 3 is a further condenser 11 which is sufficiently large to pass the scanning current wave with the required fidelity. The leads to the coils 3 are connected to the transformer 2 and to a point between the condensers 7 and 11. In the event of open circuiting of the scanning coils or the leads thereto the condenser 11 serves to prevent the flow of direct current from the transformer 2 to the boost condenser 7 so that the voltage across the boost condenser diminishes and hence the voltage applied to the control electrode of the cathode ray tube is varied correspondingly, with the result that the beam current can be reduced to such a low value that damage to the fluorescent screen is prevented.

The invention is equally applicable to circuits where the E. H. T. voltage for the cathode ray tube 4 is derived from an independent supply source or from the potential excursions set up at the output of the valve 1.

What I claim is:

A circuit arrangement embodying a cathode ray tube, a scanning circuit including scanning coils for said tube, and a transformer for feeding current to said coils, a voltage boost condenser for deriving a voltage from said scanning circuit and means for employing the voltage set up across said boost condenser for controlling the intensity of the cathode ray beam of said tube, wherein said voltage boost condenser is arranged in series with said transformer and a further condenser is provided in series between said transformer and said voltage boost condenser and one lead to the scanning coils is connected to said transformer and another lead to a point between said condensers so that in the event of an open circuit occurring in said scanning coils or the leads thereto said further condenser prevents the flow of direct current to said boost condenser so that the voltage across said boost condenser diminishes and serves to reduce the intensity of the cathode ray beam.

No references cited.